(No Model.)

J. B. LAW.
NUT LOCK.

No. 332,540. Patented Dec. 15, 1885.

WITNESSES:
W. W. Hollingsworth
P. B. Turpin.

INVENTOR:
James B. Law
BY Munn & Co.
ATTORNEYS.

UNITED STATES PATENT OFFICE.

JAMES BRADLEY LAW, OF DARLINGTON, SOUTH CAROLINA.

NUT-LOCK.

SPECIFICATION forming part of Letters Patent No. 332,540, dated December 15, 1885.

Application filed October 20, 1885. Serial No. 180,457. (No model.)

*To all whom it may concern:*

Be it known that I, JAMES B. LAW, of Darlington, in the county of Darlington and State of South Carolina, have invented a new and useful Improvement in Nut-Locks, of which the following is a description.

The invention is an improvement in nut-locks, and has for an object to so construct the nut that it will of itself furnish the lock, and the employment of detached locking devices or special constructions of bolt will be avoided.

The invention consists in the novel construction of the nut, as will be hereinafter first fully described, and then pointed out in the claim.

Figure 1:
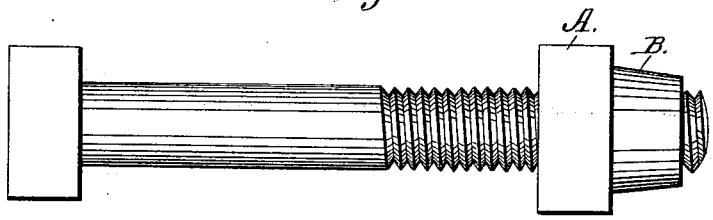
Figure 2:
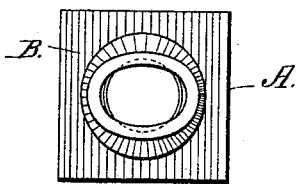
Figure 3:
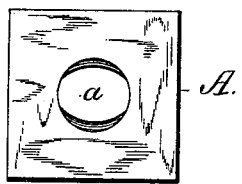
Figure 4:
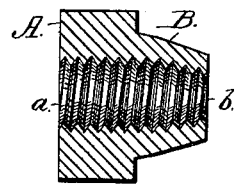
Figure 5:
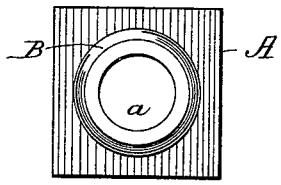

In the drawings, Figure 1 is a side view of a bolt with my nut locked in place thereon. Fig. 2 is a front end view. Fig. 3 is a rear end view, and Fig. 4 a longitudinal section of the nut ready for use. Fig. 5 is a front end view of the nut before being compressed, and Fig. 6 is a longitudinal section thereof, all of which will be described.

The nut proper, A, may be of hexagonal, octagonal, square, or other exterior shape desired. It is provided with the usual bolt-hole, *a*, threaded, as shown. On its outer or front end is formed the extension B, preferably made as a frustum of a cone and of a reduced thickness from that of the body A. The opening *a* is continued at *b* through the extension, and the bore *b* of the extension is to correspond to and join with the thread of bore *a*. This extension B, and usually the body A as well, is formed of wrought-iron or other suitable malleable metal.

Figure 6:
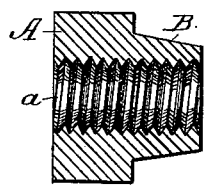

In preparing the nut for use it is first formed and tapped, as shown in Figs. 5 and 6. The extension is then compressed either in a press or other machine, or by the stroke of a hammer, into the shape shown in Figs. 2 and 3, into an elliptical cross-sectional shape. When screwed onto the bolt, as shown in Fig. 1, the bolt will, in threading into the extension, expand the same to its normal shape; but such extension will retain sufficient contracting tension or spring to hug or bind on the bolt in such manner as to prevent its being moved by the jarring of the railroad, bridge, or other structure to which it may be applied.

Heretofore nuts have been formed with end extensions of reduced thickness. Among these are the following patents: No. 247,237, of 1881; No. 225,121, of 1880; No. 118,238, of 1871, and No. 105,614, of 1870. I do not broadly claim the construction shown in these patents as my invention, which differs therefrom in the following particulars.

In the Patent No. 247,237 the end frustum is not compressed prior to application to the bolt, but only when on the same, and then by bearing in an opening in a fish-plate, and the locking is not by reason of any inherent spring of the nut-extension, but only by the binding within the fish-plate, and the locking is accomplished more by the friction of the nut in the fish-plate opening than in any other manner. It will also be seen that the nut of the said patent can only be locked adjacent the fish-plate, while by my invention it can be locked at any point.

In Patent No. 225,121 the end extension of the nut is locked by indenting a portion thereof into a keyway in the bolt. This, as will be seen, requires a special construction of bolt, which I aim to and do avoid.

Patents Nos. 118,238 and 105,614 each use an end extension which is slitted longitudinally, forming sections, which are bent to converge. In this construction the threads of the several sections which normally joined properly with each other, when the sections are bent in become to a certain degree distorted, and the sharp ends of such threads at the sides of the sections become bent or stripped, or operate to strip or partially strip the threads from the bolt, rendering such parts unfit for reuse.

My nut, it will be seen, is different from each and every one of those of the patents cited. It is complete and ready for use, it is applicable to the ordinary bolt, its extension is unslitted, and consequently has its threads connected, so as to be properly meshed by those of the bolt, and furnishes an article of manufacture which may be used and reused with good results.

It is obvious that by the elliptical shape of the extension I do not mean a true ellipse, as it might be the extension would approach such shape more or less in different nuts.

Having thus described my invention, what I claim as new is—

As a new article of manufacture, a nut provided with an unslitted end extension of reduced thickness, provided with a thread corresponding to and communicating with the thread of the nut proper, formed of malleable metal and compressed into an elliptical cross-sectional shape, substantially as set forth.

JAMES BRADLEY LAW.

Witnesses:
D. P. LIDE,
C. P. DARGON.